US005757672A

United States Patent [19]

Hoepken

[11] Patent Number: 5,757,672

[45] Date of Patent: May 26, 1998

[54] MONITORING SYSTEM AND TECHNIQUE

[75] Inventor: Hermann Friedrich Hoepken, Sprockhovel, Germany

[73] Assignee: K.A. Schmersal GmbH & Co., Wuppertal, Germany

[21] Appl. No.: 421,050

[22] Filed: Apr. 12, 1995

[30] Foreign Application Priority Data

Apr. 13, 1994 [DE] Germany .......................... 44 12 653.0

[51] Int. Cl.$^6$ ............................... G08B 1/08; H04Q 1/30

[52] U.S. Cl. ....................................... 364/551.01; 340/538

[58] Field of Search ..................................... 340/500, 505, 340/506, 512, 514, 531, 538; 364/551.01

[56] References Cited

U.S. PATENT DOCUMENTS

| | | | |
|---|---|---|---|
| 4,142,219 | 2/1979 | Kuwabara et al. . | |
| 4,203,096 | 5/1980 | Farley et al. . | |
| 4,321,592 | 3/1982 | Crandall et al. | 340/541 |
| 4,328,482 | 5/1982 | Belcher et al. | 340/310 A |
| 4,463,340 | 7/1984 | Adkins et al. | 340/64 |
| 4,573,041 | 2/1986 | Kitagawa et al. . | |
| 4,621,170 | 11/1986 | Picandet | 340/310 A |
| 4,755,792 | 7/1988 | Pezzolo et al. | 340/538 |
| 4,901,217 | 2/1990 | Wilson | 364/200 |

FOREIGN PATENT DOCUMENTS

| | | |
|---|---|---|
| 0 102 229 | 3/1984 | European Pat. Off. . |
| 38 28 272 | 3/1990 | Germany . |
| 39 07 652 | 9/1990 | Germany . |
| 9105529 U | 8/1991 | Germany . |
| 9315045 U | 1/1994 | Germany . |
| WO 87/03405 | 6/1987 | WIPO . |

OTHER PUBLICATIONS

"A Flexible Protocol Communications Approach for a Supervisory System", Valle-Alarcon et al, 1989 International Carnahan Conference on Security Technology, Oct. 3–5, 1989, Zurich, Switzerland, pp. 267–269.

"Busfahiger smarter Zweidraht-Magnetfeldsensor", Markt & Technik Nr. 39, Sep. 20, 1991.

Allen-Bradley Press Release Oct. 15, 1993 Allen-Bradley Adds Fiber Optic and Long-Range Diffuse Version to 9000 Series.

Allen Bradley Internet Advertizement for Series 9000 Photo Sensor Non-Attributed, Jul. 1997.

"Photoelectric Sensor has Heartbeat Diagnostics" p. 95 *New in Control* Control Engineering May 1994 North Amer. Ed.

*Primary Examiner*—James P. Trammell
*Assistant Examiner*—Craig Steven Miller
*Attorney, Agent, or Firm*—Alix, Yale & Ristas, LLP

[57] ABSTRACT

The operability of a plurality of sensors is monitored by periodically interrogating the sensors individually and evaluating the responses to the interrogation. The sensors are each connected to a two-conductor power supply bus via a signal processor and an interface. The information exchanged via the bus is in the form of binary coded signals generated by clocking the bus voltage.

20 Claims, 2 Drawing Sheets

MONITORING SYSTEM AND TECHNIQUE

BACKGROUND OF THE INVENTION

1. Field of the Invention

This invention relates to enhancing the safety of operation and/or security of systems and installations having multiple condition responsive sensors and, particularly, to reducing the complexity and improving the reliability of monitoring systems which include the capability of checking the status of plural, remotely located intrusion detectors. More specifically, the present invention is directed to a monitoring system which periodically interrogates a plurality of sensor equipped stations and evaluates responses provided thereby in order to determine the operability of the individual sensors and their associated circuitry. Accordingly, the general objects of the present invention are to provide novel and improved methods and apparatus of such character.

2. Description of the Prior Art

While not limited thereto in its utility, the present invention is particularly well suited for use in association with machining centers or the like which, to ensure operator safety, must be rendered inoperative if any one of several safety parameters is violated. Safety systems for installations having plural doors or other means of access which must be monitored are well known in the art. The access means of these installations are equipped with sensors which determine whether an access door has been opened or an object has been passed through an access opening which is not protected by a door. Such sensors include electromechanical safety switches, light barriers and other similar devices which provide output signals for delivery to an evaluation circuit. The evaluation circuit, in turn, will generate a command signal, to shut down the machine or installation for example, in response to a sensor output signal indicating an unauthorized or improper intrusion, i.e., the machine will be disabled upon occurrence of an unsafe operating condition. Each of the sensors can, of course, be in one of three conditions, i.e., actuated, unactuated or defective. Thus, in order to determine the state of each sensor pursuant to monitoring the operability of the safety system, each "contact pair" of each sensor must be individually evaluated. Since the sensors will each have at least two "contact pairs" corresponding to the actuated and unactuated states, in the prior art at least three conductors have extended between each sensor and the evaluation circuit.

In the interest of enhancing reliability, monitoring systems which employ a pair of microprocessors as the evaluation circuit have previously been proposed. The pair of microprocessors would be connected to the sensors and to one another in such a manner as to provide for redundant checking of the sensors. In such a system, each microprocessor will be connected to each sensor, and to the other microprocessor. Also, regardless of the number of evaluation microprocessors employed, conductors must be provided for furnishing power to each of the individual components of the monitoring system. This results in a wiring system of considerable complexity. The cost and difficulty of installation of such a complex wiring system would, in many cases, be increased by the necessity of using shielded cable in order to avoid interference and particularly "false" triggering of a shut-down command because of "noise" induced in the wiring.

A further deficiency of prior art monitoring systems, and particularly those wherein the sensors consisted of series-connected light barriers, resided in the fact that self testing of the individual light barriers was not possible.

SUMMARY OF THE INVENTION

The present invention overcomes the above-briefly discussed and other deficiencies and disadvantages of the prior art and, in so doing, achieves the monitoring of the state of plural sensors in a less complicated, and thus more reliable and less expensive, manner than has previously been proposed. Apparatus in accordance with the present invention is characterized by the use of a two-conductor "reliability" bus which interconnects all of the sensors which are to be stimulated for the purpose of a status check. The two-wire bus is connected to a single operating voltage source which provides power for the monitoring system. The sensors are stimulated, i.e., interrogated, by means of pulse-coded test command signals and respond by generating a pulse-coded signal commensurate with the received code and the state of the sensor. The mode of data transmission in accordance with the invention is clocking, i.e, pulsing, the operating voltage. Such clocking of the operating voltage is enabled by the use of active bus interface circuits, associated with each sensor, which include a buffer.

In accordance with the invention, the targeted, reliable evaluation of sensors in a plural sensor monitoring system utilizes a two-conductor bus over which power is supplied to the circuitry associated with each sensor and to the sensor itself and over which dynamic detection of the states of the sensors is accomplished. A significant feature of the invention resides in the fact that signal evaluation does not occur either in the sensor element or the circuitry of the monitoring system which is located in the proximity of and associated with the sensor element. To the contrary, "ambivalent" switching signals, i.e., function signals which are not specific to any one sensor, provided by an evaluation signal processor are merely conditioned at the sensor location. Information commensurate with the state of the groups of "contacts" of the sensor is transmitted back to the evaluation signal processor in response to a received function query, i.e., a test command. The stimulation of individual sensors, i.e., the sensor switching signals, are thus transmitted via the two-wire power bus along with unique address information.

The present invention permits the use of a two-conductor bus and eliminates the need for special cables. Thus, the invention reduces the number of wires required to achieve monitoring and simplifies the installation of the monitoring system. As noted above, the supply of power to the individual components of the monitoring system is accomplished via the two-conductor bus and the sensors to be monitored are stimulated cyclically by modulating the voltage level measured between the bus conductors. The stimulation of the sensors results in corresponding modulation of the bus voltage level, i.e., the "answers" are in the same form as the interrogatories. The sensors with which the present invention may be employed may have one or more channels, i.e., contact pairs or the equivalent thereof. The present invention is further characterized by the use of very low level currents for data transmission and, accordingly, safety devices such as circuit breakers are unnecessary. In the operation of the invention, failures of individual components of the monitoring device and in the interconnecting wiring will be detected.

As noted above, data transmission via the two-conductor bus of the present invention is accomplished by "clocking" the operating voltage. The operating voltage is maintained across active bus interfaces at each sensor location by means of a buffer circuit. The pulse train comprising a transmitted data stream will, at each sensor, be decoded and tested by a signal processor. The processor associated with each sensor can receive the test command and enable the sensor as soon as the operating voltage of the buffer circuit exceeds a threshhold value. A start signal for the test can be generated from the enable signal with a time delay.

The signal processor associated with each sensor answers, in a fixed time-slot pattern, a correct, i.e., properly addressed, data stream by "clocking" or pulsing the voltage on the two-conductor bus. For this purpose, the operating voltage on the bus can be virtually short circuited for maximum time periods fixed by the transmission rate.

BRIEF DESCRIPTION OF THE DRAWINGS

The present invention may be better understood and its numerous objects and advantages will become apparent to those skilled in the art by reference to the accompanying drawings wherein like reference numeral refer to like elements in the two figures and in which.

DESCRIPTION OF THE DISCLOSED EMBODIMENT

Figure 1:
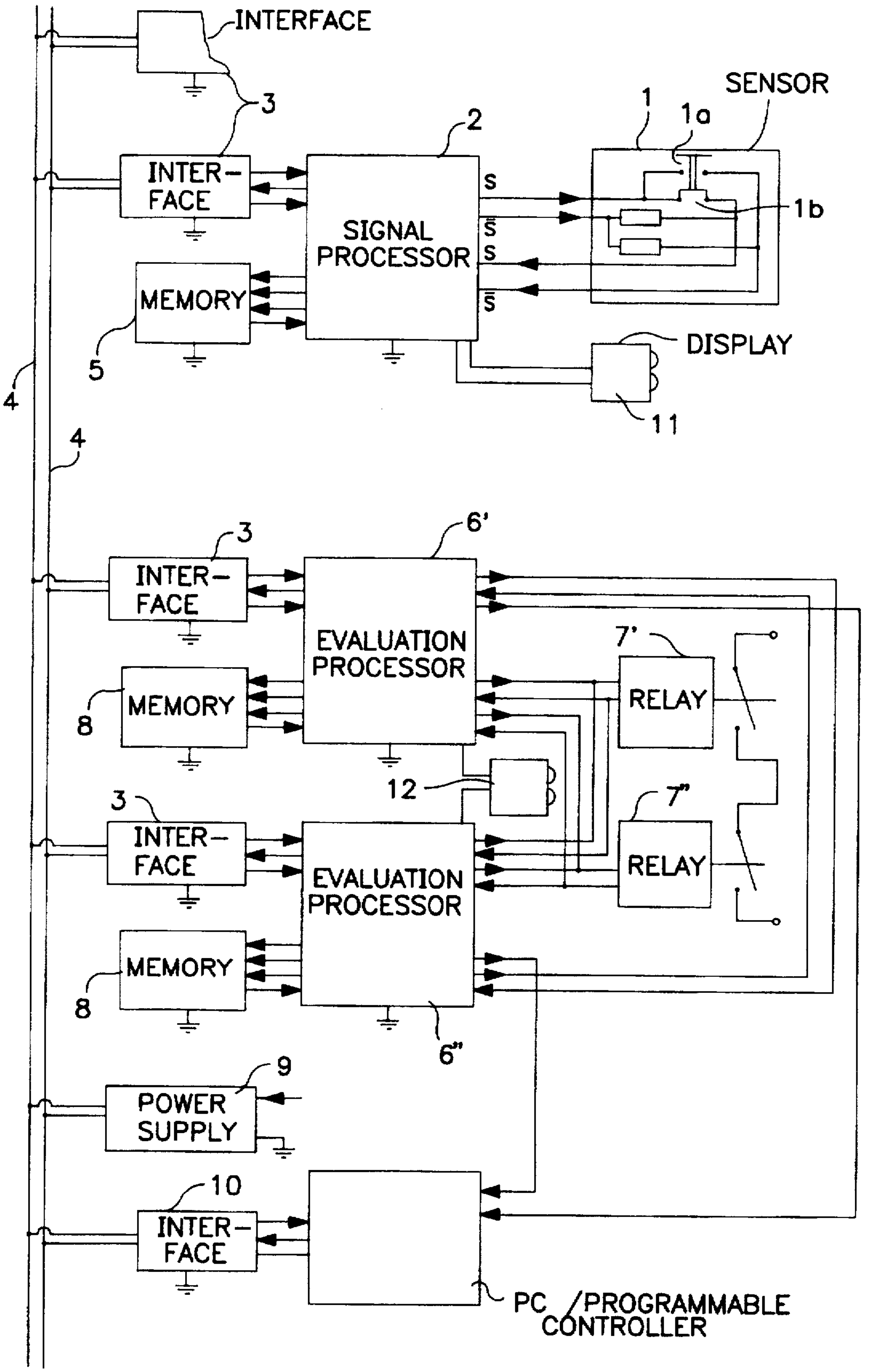
FIG. 1 is a block diagram of a monitoring system in accordance with a first embodiment of the invention.

With reference to FIG. 1, the disclosed embodiment of the invention is intended for use in monitoring the status of a multiplicity of sensors 1. In the interest of facilitating understanding of the invention, only a single sensor 1 has been depicted in the drawing. Sensor 1 has been represented as a double pole, double throw switch having a pair of normally open contacts and a pair of normally closed contacts. Sensor 1 may, however, be any condition responsive device which can be tested by application of different voltage levels, one of which may be ground potential, to a pair of input terminals. The sensors 1 may provide output signals in analog or digital format. The sensors 1 will typically be associated with doors, flaps, passages or the like on a device to be secured, such as a machining center, so that upon opening of the door, flap or the like the sensor is actuated. In the example shown, sensor actuation would be indicated by the closing of contacts **1*a* and the opening of contacts 1*b*. In other words, in the case of a sensor having actual or simulated switch contact pairs, actuation will cause a change of the digital circuit state as will be described in more detail below. As noted above, sensor 1** may, upon stimulation, produce an analog signal or may be a circuit device which generates a code, i.e., a "TAG", when stimulated. The present invention may also be employed with sensors which provide hybrid output signals, i.e., a mixture of a "TAG" and an analog or digital signal.

A signal "processor" 2 is associated with each sensor 1. The processors 2 each comprise a clock generator, i.e., a watchdog timer. The signal processors 2 have, associated therewith, a non-volatile memory 5, typically an $E^2$PROM. Processor 2 is connected to a two-conductor bus 4, i.e., the "reliability bus", via a bus interface circuit 3. The bus interface circuit 3 is shown in detail in FIG. 2 and will be described below. The two-conductor bus 4 can be comprised of non-shielded conductors and may interconnect the multiplicity of sensors 1 in a tree and/or star-shaped circuit pattern. One conductor of bus 4 will typically be grounded while the other conductor, in most cases the positive polarity conductor, will be employed to transmit both power and data. As will be described in more detail below, data transmission is accomplished by pulse modulation of the voltage level measured between the conductors of bus 4, i.e. by clocking the operating voltage.

All of the sensors 1 are connected via the two-conductor bus 4 to an evaluation circuit which, in the exemplary embodiment represented, comprises a pair of data processors 6' and 6". The processors 6', 6" are also connected to bus 4 via bus interfaces 3 and are directly interconnected so as to communicate with one another. The evaluation processors 6', 6" will include clock generators. Both of processors 6' and 6" are connected to relays 7' and 7". The contacts of relays 7' and 7" are connected in series and in series with the supply of power to the machine or installation which is to be protected. A non-volitile memory 8, for example an $E^2$PROM, is associated with each of processors 6, 6". The memories 8 respectively contain the unique addresses of each of the sensors 1 which are to be monitored.

A power supply 9 is also connected to bus 4. Power supply 9 may, for example, be a 24 volt direct current source having a high internal resistance. The high internal resistance enables power supply 9 to provide constant current even though the load connected between the bus conductors is periodically momentarily reduced to a low level during data transmission.

The two-conductor bus 4 is further connected, via an interface 10, to a programmable controller which may be employed for the purpose of providing the memories 5 and 8 with the required data and, possibly, also a dedicated check sum. Such loading of memories 5 and 8 is possible, for example, by means of a simple ASCII protocol. When power is applied, the stored data is read out of memories 5, 8 and compared with the check sum as well as being loaded into the memories of the processors 6', 6". One of the evaluation processors, for example processor 6', will stimulate a specific sensor 1 by modulating the voltage across the conductors of bus 4. The bus voltage will be modulated to produce a binary code message consisting of the address of the sensor to be stimulated, a function and a test word, A check sum. For example, a data package or stream applied to bus 4 will be in the form of a series of pulses which, for example, vary the bus voltage between the 5 and 24 volt levels. This message will be transmitted to all of the sensor processors 2 connected to bus 4. The other evaluation processor, in the example being described processor 6", will "listen" to the transmission from processor 6' in order to check the signal, and thus the function of processor 6', for the purpose of redundancy.

When a message, in the form of a series of pulsed variations in the bus voltage is received by a sensor processor 2, that message will be checked to see if it contains the address of the associated sensor. If addressed, the sensor processor 2 will provide the function signals commensurate with a received test command, i.e., voltage levels, at its S and S output terminals. By way of example, if evaluation processor 6' generates a properly timed test command signal or interrogatory 1010, considering the switch contacts **1*a* and 1*b* in the state shown, the S and S signals remain unchanged and appear again at the inputs to processor 2**. Thus, the answer to the query 1010 is likewise 1010.

In the example being described, if sensor 1 was in the actuated state, i.e., contacts **1*a* closed and contacts 1*b* open, the transmitted test command 1001 would result in the answer 1010. Similarly, for the query 0101, the answer would be 0101 for an unactuated sensor 1, but would be 0110 for an actuated sensor 1**.

The sensor processor 2 may have, associated therewith, a state display 11. In a simplified example, display 11 may consist of a red and a green LED which are energized in accordance with the state of the switch contacts as represented by the above "answers".

The answers from sensor 1, as conditioned by processor 2 and "transmitted" to bus 4 by interface 3, are evaluated by both of evaluation processors 6', 6". When the answer does not correspond to the transmitted function, one or both of the evaluation processors will cause energization of the relays 7' and 7".

If the transmitted function does not reach an addressed sensor 1, there will be no answer. This equates to a time-out error. A false check word, i.e., check sum, is produced for each such data error.

In accordance with the preferred embodiment of the invention, a switch is made between "active" evaluation processors 6' and 6" either after each sensor check or after each checking cycle.

In the case of the data streams employed in the practice of the present invention, as described above, it is expedient for one byte to contain the address, two further bytes to contain the function or query and the data record for the sensor, while two additional bytes contain the test word which secures the information to be transmitted. As noted above, a false check word is produced in the event of a data error. If the data stream arrives at the sensor processor 2 with an error, the sensor processor will refuse to accept the transmitted information, with the result that the evaluation circuit detects a time-out error. A plurality of such errors on the same sensor will result in the generation of a fault signal since a plurality of successive time out errors is indicative of a sensor defect.

To summarize, the present invention is effectively a two-channel monitoring device which is fail-safe as a consequence of self-diagnosis. This unique monitoring device has enhanced reliability and ease of installation because of the reduced wiring when compared to the prior art. The invention operates such that a fault in a sensor 1 is detected before a dangerous state can occur.

Should a fault occur which causes a plurality of sensors 1 to have the same address, data overlaps will occur in the answers of the sensors. Since the two-wire bus 4 is active "low", each sensor 1 can pass its signal onto the bus via a "low". This produces a logic NOR operation on bus 4 with the result that the calculated check sum is not equal to the check sum of the message generated by the evaluation processor. Accordingly, an error will be detected which produces the generation of a fault signal.

Likewise, if bus 4 is interrupted, a time-out error will result.

Similarly, if bus 4 is erroneously clamped "high", this condition is recognized by the evaluation circuit upon the first attempt at data transmission. Such an error will be evaluated and reported.

The present invention also permits the monitoring of the two-conductor bus 4 for faults through the use of the personal computer or programmer controller connected to the bus by means of interface 10.

The results of the testing performed by evaluation processors 6' and 6" can be displayed, for example, by energizing either a red or a green LED included in a display device 12 connected to each of the evaluation processors.

Figure 2:
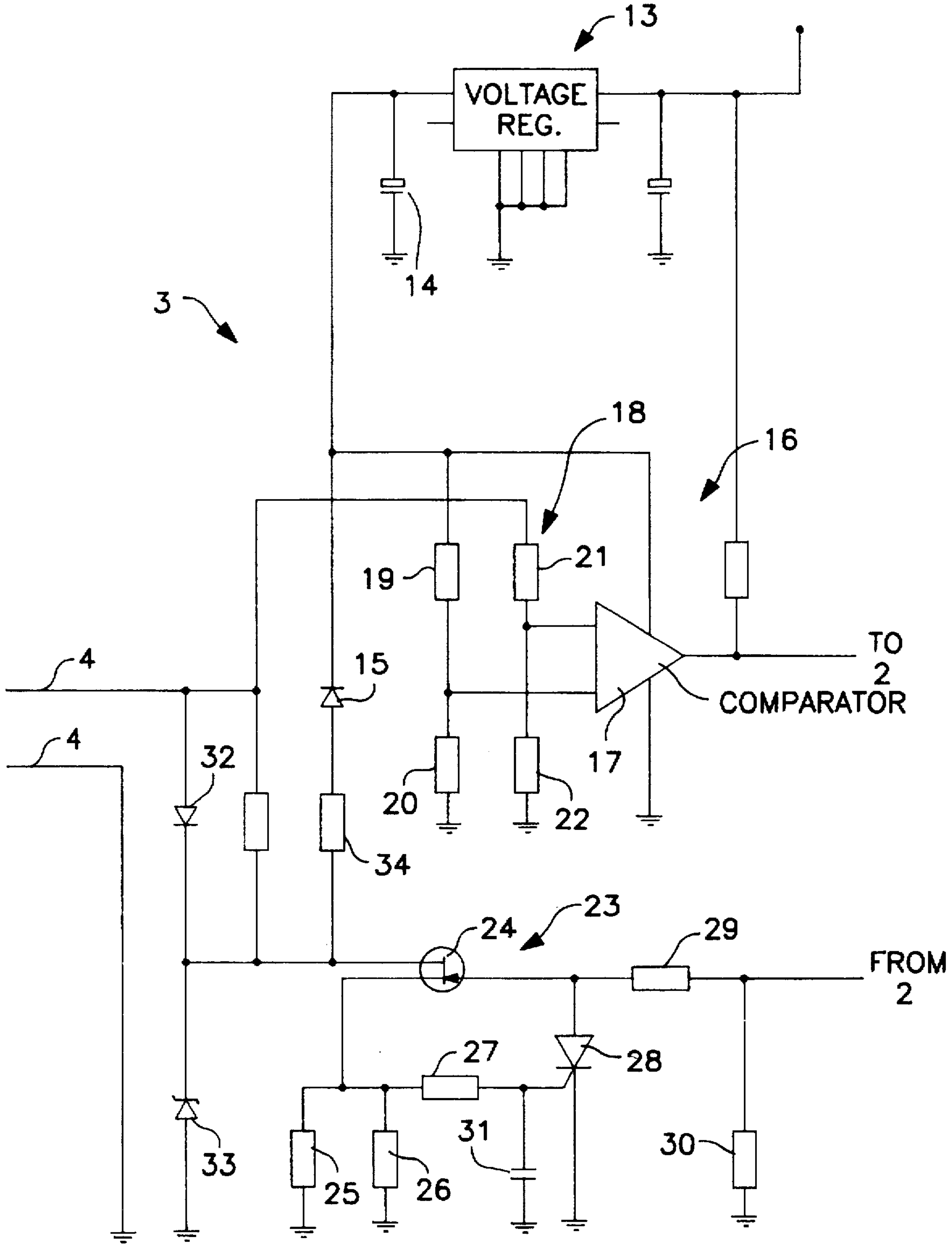
FIG. 2 is a schematic diagram of an interface circuit for use in the system of FIG. 1.

Referring now to FIG. 2, one of the interface circuits 3 is shown partly schematically and partly in block diagram form. The interface 3 includes a voltage regulator 13 of conventional design which has a buffer capacitor 14. Capacitor 14 will be charged to the "high" level of the voltage on bus 4 via diode 15 and will be blocked against discharge by this diode when the bus voltage drops. Capacitor 14 will store the actual voltage present on bus 4 at the interface 3. This voltage will be less than the voltage measured at the terminals of power supply 9 due to the voltage drop along bus 4, this voltage drop being a function of the resistivity of the bus and distance between power supply 9 and the particular interface 3. During data transmission, i.e., when the bus voltage is caused to periodically drop to a "low" level, buffer capacitor 14 will ensure that the proper operating voltage is present for the associated sensor processor 2, sensor 1 and memory 5. Likewise, the buffer capacitors in the interface circuits 3 associated with the evaluation processors 6' and 6" will ensure the proper operating voltage for these processors.

Interface 3 further comprises a receiver section, indicated generally at 16, which is defined by a voltage comparator 17 and a voltage divider network indicated generally at 18. The voltage divider network consists of a first voltage divider, formed by resistors 19 and 20, and a second voltage divider, formed by resistors 21 and 22. The voltage divider defined by resistors 19 and 20, in one embodiment, will divide the voltage stored on buffer capacitor 14 in half. This divided voltage will be applied as a reference voltage at a first input of comparator 17. Comparator 17 will thus have a dynamic operating point, i.e., a reference or trigger threshold voltage level which varies with the bus voltage at the particular interface. Due to the characteristics of the RC circuit comprising buffer capacitor 14 and the resistive voltage divider, when the actual bus voltage drops, the trigger threshold of comparator 17 as determined by the reference voltage will lag the actual bus voltage which, when data is being transmitted, will be a pair of voltage levels, i.e., a binary signal. In the example being described, the voltage divider comprising resistors 21 and 22 divides the bus voltage by three-quarters. Accordingly, when there is no information bearing pulse modulated on the bus voltage, the signal applied to the second input of comparator 17 will be "high", i.e., above the trigger threshold established by the reference voltage. Conversely, when a data pulse appears on the bus 4, the voltage level at the second input to comparator 17 will lie reliably, correspondingly "low", i.e., will be less than the reference voltage level. Comparator 17 thus shapes the information bearing signals applied to bus 4 in the form of modulation of the bus voltage, and provides corresponding pulses at the input to a processor.

The interface circuit 3 also comprises a transmitter section, indicated generally at 23, which includes an $L^2$MOSFET transistor 24. Transistor 24 functions as a switch which is controlled by an associated processor, i.e., a processor 2 or an evaluation processor 6',6". Thus, the gate of transistor 24 is connected, via a resistor 29, to an output of the associated processor. The current through transistor 24 is monitored by means of a pair of parallel connected resistors 25 and 26, these resistors being connected between the source of transistor 24 and ground. The source of transistor 24 is also connected, via resistor 27, to the gate of a thyristor 28. The anode of thyristor 28 is directly connected to the gate of transistor 24. When the current through transistor 24 becomes excessive, the voltage drop across resistors 25, 26 will exceed the trigger level of thyristor 28. The thyristor 28 will thus be biased into the conductive state and will cause transistor 24 to be turned off by pulling its gate essentially to ground potential. Accordingly, excessive current on bus 4 is prevented. Thyristor 28, when turned on, will remain conductive during the remainder of the duration of an output pulse, i.e., during the time one bit is generated by the associated processor.

A resistor 30 is connected between line side of resistor 29 and ground, as shown, to ensure that transistor 24 will not be turned on during the initial application of voltage to bus 4, i.e., during the charging of buffer capacitor 14.

In order to provide transient suppression, i.e., to prevent the "firing" of thyristor 28 in response to "noise", a capacitor 31 is connected between the gate of the thyristor and ground.

In the manner known in the art, a diode 32 is connected between the drain of transistor 24 and the ungrounded conductor of bus 4 to provide polarity reversal protection. Likewise a Zener diode 33 is connected between the drain of transistor 24 and ground to provide over-voltage protection for the transistor.

The interface circuit also includes a current limiting resistor 34 which limits the current through transistor 24 in the event of a fault.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. In apparatus for monitoring the states of a plurality of condition responsive sensors, each sensor being identified by a unique address, the monitoring apparatus including an evaluation circuit which generates binary coded sensor address signals and binary coded test command signals, said evaluation circuit also evaluating binary signals commensurate with output signals provided by an addressed sensor in response to stimulation, the improvement comprising:

dedicated signal processor means connected to each sensor to be monitored, said processor means each being responsive to received binary address signals commensurate with the identification of the associated sensor for applying a stimulating signal commensurate with a received test command signal to the associated sensor, said processor means also detecting the state of the sensor upon application of said stimulating signal thereto and providing binary status signals commensurate with sensor state;

a two conductor bus for connecting the evaluation circuit to said signal processor means;

a source of direct current connected across the conductors of said bus, said source providing a direct current operating voltage for said signal processor means; and interface means for connecting the evaluation circuit across said bus conductors and for connecting each of said signal processor means across said bus conductors, said interface means each including:

transmitter means responsive to binary coded signals provided thereto by the evaluation circuit or to binary status signals provided thereto by a said signal processor means for modulating the voltage measured between said bus conductors between a first level commensurate with a first binary state and a second level commensurate with the second binary state whereby sensor identification and test commands or the response of a sensor to a stimulating signal commensurate with a test command may be caused to appear as variations in the direct current bus voltage;

receiver means responsive to variations in the direct current voltage measured between said bus conductors for providing an information bearing pulse train to an associated signal processor means or the evaluation circuit; and buffer means for maintaining an operating voltage at the associated signal processor means or the evaluation circuit.

2. The apparatus of claim 1, characterized in that the two-conductor bus is configured as a star and/or tree.

3. The apparatus of claim 1, characterized in that said signal processor means each include means for storing address information, the data modulated on said bus by the evaluation circuit being compared in terms of address with the associated sensor address in each signal processor means and accompanying test command signals being processed and stimulating signals applied to the associated sensor in the event of address correspondence.

4. The apparatus of claim 3, characterized in that each signal processor means comprises a non-volatile memory for storing the address of the associated sensor.

5. The apparatus of claim 1 characterized in that said direct current source is a constant current supply having a high internal resistance.

6. The apparatus of claim 1, characterized in that the evaluation circuit comprises two redundantly connected evaluation circuits, each of said evaluation circuits including an evaluation processor having a non-volatile memory.

7. The apparatus of claim 1, characterized in that said buffer means stores the power supply voltage which appears across the bus conductors at each said interface means in the absence of modulation to thereby maintain an operating voltage for the associated signal processor means or the evaluation circuit.

8. The apparatus of claim 7, characterized in that said buffer means comprises a buffer capacitor which is charged from the bus via a diode.

9. The apparatus of claim 7, characterized in that said receiver means includes comparator means and means for establishing a comparator trigger threshold voltage level which varies in accordance with the actual bus voltage.

10. The apparatus of claim 9, characterized in that said means for establishing a trigger threshold voltage level comprises a voltage divider.

11. The apparatus of claim 9, characterized in that said receiver means further comprises means for dividing the modulated bus voltage and applying said divided boltage as a second input of said comparator means, said voltage dividing means ensuring that the voltages commensurate with said binary states are respectively reliably above and below the trigger threshold.

12. The apparatus of claim 7, characterized in that said transmitter means comprises a short circuit-proof switch means.

13. The apparatus of claim 9, characterized in that said transmitter means further comprises a thyristor which, in the event of over-current on said bus, is blocked for a whole bit period of the binary signal.

14. The apparatus of claim 1, characterized in that each signal processor means further comprises a state display.

15. The apparatus of claim 1, characterized in that said bus is further connected to a programmable controller.

16. The apparatus of claim 11, characterized in that said signal processor means each include means for storing address information, the data modulated on said bus by the evaluation circuit being compared in terms of address with the associated sensor address in each signal processor means and accompanying test command signals being processed and stimulating signals applied to the associated sensor in the event of address correspondence.

17. The apparatus of claim 16, characterized in that each signal processor means comprises a non-volatile memory for storing the address of the associated sensor.

18. The apparatus of claim 17, characterized in that said transmitter means further comprises a thyristor which, in the event of over-current on said bus, is blocked for a whole bit period of the binary signal.

19. The apparatus of claim 18 characterized in that said direct current source is a constant current supply having a high internal resistance.

20. The apparatus of claim 19, characterized in that each signal processor means further comprises a state display.

* * * * *